US009722940B2

United States Patent
Du et al.

(10) Patent No.: US 9,722,940 B2
(45) Date of Patent: Aug. 1, 2017

(54) IMPLEMENTATION METHOD FOR APPLICATION FOR SPEAKING RIGHT OF LTE-BASED BROADBAND TRUNKING SYSTEM

(71) Applicant: ZTE Corporation, Shenzhen (CN)

(72) Inventors: Gaopeng Du, Shenzhen (CN); Qun Li, Shenzhen (CN); Zijiang Ma, Shenzhen (CN); Shouyong Zhang, Shenzhen (CN); Ding Ding, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 79 days.

(21) Appl. No.: 14/411,582

(22) PCT Filed: Sep. 17, 2013

(86) PCT No.: PCT/CN2013/083680
§ 371 (c)(1),
(2) Date: Dec. 29, 2014

(87) PCT Pub. No.: WO2014/067358
PCT Pub. Date: May 8, 2014

(65) Prior Publication Data
US 2015/0350098 A1 Dec. 3, 2015

(30) Foreign Application Priority Data
Nov. 2, 2012 (CN) .......................... 2012 1 0432222

(51) Int. Cl.
*H04W 4/00* (2009.01)
*H04L 12/891* (2013.01)
(Continued)

(52) U.S. Cl.
CPC ............ *H04L 47/41* (2013.01); *H04L 45/245* (2013.01); *H04W 4/06* (2013.01); *H04W 4/08* (2013.01);
(Continued)

(58) Field of Classification Search
CPC .................................................. H04W 84/042
(Continued)

(56) References Cited

U.S. PATENT DOCUMENTS 7,983,199 B1 * 7/2011 Nguyen .............. H04L 65/4061
370/260
2006/0126635 A1 6/2006 Alberth et al.
(Continued)

FOREIGN PATENT DOCUMENTS

CN 101729995 A 6/2010
CN 101860810 A 10/2010
(Continued)

OTHER PUBLICATIONS

International Search Report of PCT/CN2013/083680, dated Dec. 19, 2013.

Primary Examiner — Shripal Khajuria
(74) Attorney, Agent, or Firm — Banner & Witcoff, Ltd.

(57) ABSTRACT

A method for implementing the application for speaking right of a Long Term Evolution (LTE)-based broadband trunking system, a Mobility Management Entity (MME), a network subsystem, a broadband wireless access subsystem and the LTE-based broadband trunking system are disclosed. The method includes: the broadband wireless access subsystem sending a trunking speaking right update request to the network subsystem, receiving the trunking speaking right update accept message returned by the network subsystem, and sending the trunking speaking right update accept message to a speaking right seizing terminal; and the broadband wireless access subsystem receiving the speaking right occupation prompt message sent by the network subsystem, and sending the trunking speaking right occupation prompt message and updated configuration information via
(Continued)

a multicast control channel of an enhanced Multimedia Broadcast Multicast Service (eMBMS).

18 Claims, 5 Drawing Sheets

(51) Int. Cl.
  *H04L 12/709* (2013.01)
  *H04W 4/08* (2009.01)
  *H04W 4/06* (2009.01)
  *H04W 4/10* (2009.01)
  *H04W 84/04* (2009.01)
  *H04W 76/00* (2009.01)

(52) U.S. Cl.
  CPC ........... *H04W 4/10* (2013.01); *H04W 76/005* (2013.01); *H04W 76/002* (2013.01); *H04W 84/042* (2013.01)

(58) Field of Classification Search
  USPC ......................................................... 370/328
  See application file for complete search history.

(56) References Cited

U.S. PATENT DOCUMENTS

| | | | |
|---|---|---|---|
| 2009/0036118 A1* | 2/2009 | Liu | H04W 72/005 455/426.1 |
| 2012/0163204 A1 | 6/2012 | Oprescu-Surcobe et al. | |
| 2012/0170502 A1 | 7/2012 | Korus et al. | |
| 2012/0170505 A1 | 7/2012 | Xiao et al. | |

FOREIGN PATENT DOCUMENTS

| | | |
|---|---|---|
| CN | 101877873 A | 11/2010 |
| CN | 102547596 A | 7/2012 |
| EP | 1447945 A2 | 8/2004 |
| WO | 2011097763 A1 | 8/2011 |

* cited by examiner

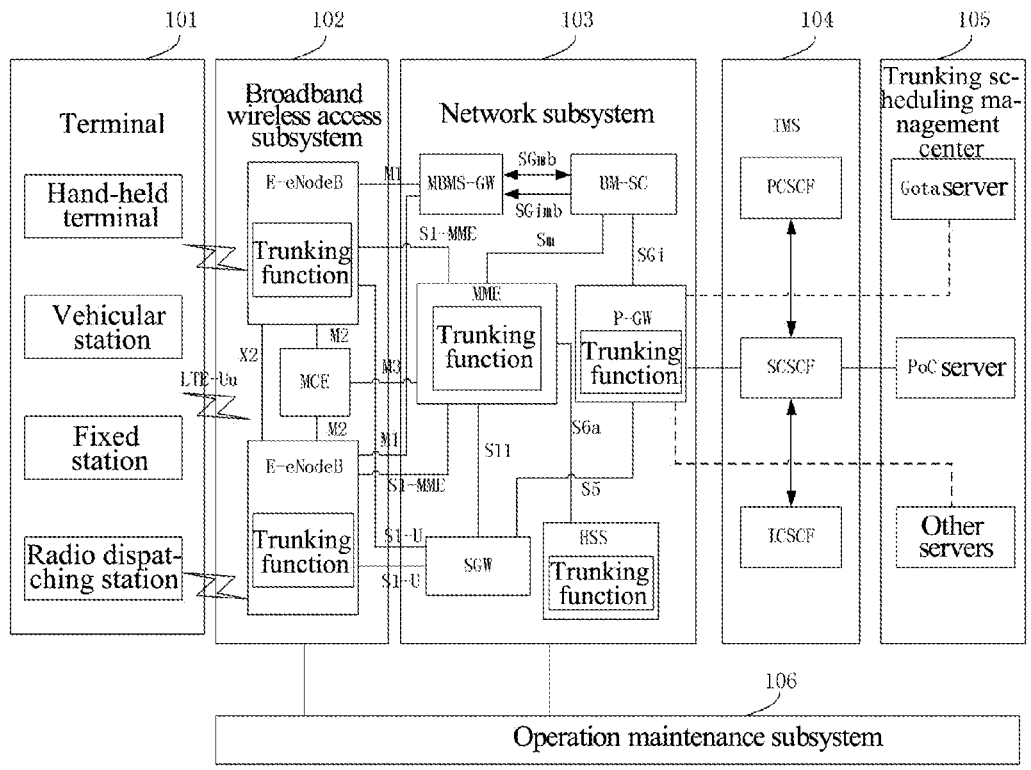

FIG. 1

The broadband wireless access subsystem sends a trunking speaking right update request to the network subsystem, receives a trunking speaking right update accept message returned by the network subsystem, and sends the trunking speaking right update accept message to the terminal applying for speaking right — 11

The broadband wireless access subsystem receives a speaking right occupation prompt message sent by the network subsystem, and sends a trunking speaking right occupation prompt message and updated configuration information to all terminals within the group to which the terminal applying for speaking right belongs via a multicast control channel of an enhanced Multimedia Broadcast Multicast Service (eMBMS) — 12

FIG. 2

IMPLEMENTATION METHOD FOR APPLICATION FOR SPEAKING RIGHT OF LTE-BASED BROADBAND TRUNKING SYSTEM

TECHNICAL FIELD

The present document relates to the field of broadband digital trunking system, and particularly, to a method for implementing the application for speaking right of a Long Term Evolution (LTE)-based broadband trunking system, a Mobility Management Entity (MME), a network subsystem, a broadband wireless access subsystem and the LTE-based broadband trunking system.

BACKGROUND OF THE RELATED ART

With the development of the communication technology and the peoples' increasing insight into the trunking system, the trunking system, as an efficient emergency command scheduling system, plays a more and more important role. A trunking communication system is widely applied in the fields of government sectors, public security, emergency communication, electric power, civil aviation, petrochemical industry and military and so on. The development of the trunking system goes through stages of an analog trunking system and a narrowband digital trunking system, wherein many drawbacks exist in both two stages of the trunking systems, and the analog trunking system has disadvantages of large interference, many blind zones and limited frequency and so on, and with regard to the narrowband digital trunking system, even though it has improvement in the quality and capacity of communication relative to the analog trunking system, it is still weak in the aspects of data transmission capability and capability for supporting multimedia services, moreover, the narrowband digital trunking system has certain difficulties in evolving to the Long Term Evolution (LTE)-based broadband digital trunking system.

At present, the LTE-based broadband digital trunking system has become a development direction of the next generation trunking system, the related standard studies on the LTE-based broadband digital trunking system are being carried out domestically, and operators and enterprises wish to perform corresponding modifications or extensions as far as possible so as to complete the deployment of the LTE-based broadband digital trunking system based on the current existing LTE network and technology, thus not only the related LTE network and technology can be better utilized, but also the input costs are minimized for the operators and enterprises. Therefore, how to utilize the existing LTE network and technology to deploy a framework of the LTE-based broadband digital trunking system and to implement the application for speaking right of trunking services also becomes a problem required to be solved urgently.

SUMMARY OF THE INVENTION

The example of the present document provides a method for implementing application for speaking right of a Long Term Evolution (LTE)-based broadband trunking system, a Mobility Management Entity (MME), a network subsystem, a broadband wireless access subsystem and the LTE-based broadband trunking system, to solve the problem how to utilize the existing LTE network and technology to deploy a framework of the LTE-based broadband digital trunking system and to implement the application for speaking right of trunking services.

The example of the present document provides a method for implementing the application for speaking right of a Long Term Evolution (LTE)-based broadband trunking system, wherein the LTE-based broadband trunking system comprises a terminal applying for speaking right, a broadband wireless access subsystem, a network subsystem and a trunking scheduling management center, and the method comprises:

the broadband wireless access subsystem sending a trunking speaking right update request to the network subsystem, receiving a trunking speaking right update accept message returned by the network subsystem, and sending the trunking speaking right update accept message to the terminal applying for speaking right; and the broadband wireless access subsystem receiving a speaking right occupation prompt message sent by the network subsystem, and sending the trunking speaking right occupation prompt message and updated configuration information to all terminals within a group to which the terminal applying for speaking right belongs via a multicast control channel of an enhanced Multimedia Broadcast Multicast Service (eMBMS).

Preferably, before the broadband wireless access subsystem sends the trunking speaking right update request to the network subsystem, the method further comprises:

the broadband wireless access subsystem completing an establishment of a default bearer by interacting with the terminal applying for speaking right, the network subsystem and the trunking scheduling management center; and the broadband wireless access subsystem transparently transferring a trunking dedicated speaking right request sent by the terminal applying for speaking right to the network subsystem, so that the network subsystem completes an establishment of a trunking dedicated bearer.

Preferably, the broadband wireless access subsystem completing the establishment of the default bearer by interacting with the terminal applying for speaking right, the network subsystem and the trunking scheduling management center comprises:

the broadband wireless access subsystem receiving a trunking speaking right application request sent by the terminal applying for speaking right, and sending the trunking speaking right application request to the trunking scheduling management center via the network subsystem; and the network subsystem receiving a trunking context establishment request sent by the trunking scheduling management center, and interacting with the broadband wireless access subsystem and the terminal to complete the establishment of the default bearer; wherein the trunking context establishment request is sent after the trunking scheduling management center performs authentication, certification and policy decision on the terminal after receiving the trunking speaking right application request.

Preferably, the broadband wireless access subsystem sending the trunking speaking right update request to the network subsystem, and receiving the trunking speaking right update accept message returned by the network subsystem comprises:

the broadband wireless access subsystem sending the trunking speaking right update request to the network subsystem, the network subsystem receiving the trunking speaking right update accept message returned by the trunking scheduling management center after performing information updating of a trunking speaking right with the trunking scheduling management center according to the trunking speaking right update request, and the broadband wireless access subsystem receiving the trunking speaking right update accept message returned by the network subsystem.

The example of the present document further provides a method for implementing the application for speaking right of a Long Term Evolution (LTE)-based broadband trunking system, wherein the LTE-based broadband trunking system comprises a terminal applying for speaking right, a broadband wireless access subsystem, a network subsystem and a trunking scheduling management center, and the method comprises:

the network subsystem performing information updating of a trunking speaking right with the trunking scheduling management center, and sending the trunking speaking right update accept message to the terminal applying for speaking right via the broadband wireless access subsystem; and the network subsystem sending a speaking right occupation prompt message to the broadband wireless access subsystem, so that the broadband wireless access subsystem sends trunking speaking right occupation prompt message and updated configuration information to all terminals within a group to which the terminal applying for speaking right belongs via a multicast control channel of an enhanced Multimedia Broadcast Multicast Service (eMBMS).

Preferably, before the network subsystem performs information updating of the trunking speaking right with the trunking scheduling management center, the method further comprises:

the network subsystem completing an establishment of a default bearer between the network subsystem, the broadband wireless access subsystem and the terminal applying for speaking right by interacting with the terminal applying for speaking right, the broadband wireless access subsystem and the trunking scheduling management center; and the network subsystem receiving a trunking dedicated speaking right request transparently transferred by the terminal applying for speaking right via the broadband wireless access subsystem, and interacting with the broadband wireless access subsystem and the terminal applying for speaking right to complete an establishment of a trunking dedicated bearer.

Preferably, the network subsystem completing the establishment of the default bearer between the network subsystem, the broadband wireless access subsystem and the terminal applying for speaking right by interacting with the terminal applying for speaking right, the broadband wireless access subsystem and the trunking scheduling management center comprises:

the network subsystem receiving a trunking speaking right application request sent by the terminal applying for speaking right via the broadband wireless access subsystem, and sending the trunking speaking right application request to the trunking scheduling management center; and the network subsystem receiving a trunking context establishment request sent by the trunking scheduling management center, and interacting with the broadband wireless access subsystem and the terminal applying for speaking right to complete the establishment of the default bearer; wherein the trunking context establishment request is sent after the trunking scheduling management center performs authentication, certification and policy decision on the terminal applying for speaking right after receiving the trunking speaking right application request.

Preferably, the network subsystem sending the trunking speaking right update accept message to the terminal applying for speaking right via the broadband wireless access subsystem comprises:

the network subsystem receiving the trunking speaking right update accept message sent by the trunking scheduling management center, and sending the trunking speaking right update accept message to the terminal applying for speaking right via the broadband wireless access subsystem.

The example of the present document further provides a Mobility Management Entity (MME), which is applied in an LTE-based broadband trunking system; the MME comprises:

a first establishment module, configured to: by interacting with a terminal applying for speaking right, a first base station to which the terminal applying for speaking right belongs and a trunking scheduling management center, complete an establishment of a default bearer between the first establishment module, the first base station and the terminal applying for speaking right;

a second establishment module, configured to: by interacting with the first base station, and a Service Gateway (SGW) and a Packet Data Network Gateway (P-GW) located in the same network subsystem in which the MME is located, complete an establishment of a trunking dedicated speaking right application bearer;

an update module, configured to: by interacting with a Multimedia Broadcast Multicast Service-Gateway (MBMS-GW), the SGW and the trunking scheduling management center, complete a trunking speaking right update, and send a trunking speaking right request accept message to the terminal applying for speaking right via the first base station; and an occupation module, configured to: send a trunking speaking right occupation prompt respectively to the first base station and a second base station to which other idle terminals belongs in the same group where the terminal applying for speaking right is located, so that the first base station and the second base station notify all terminals within a corresponding trunking area of speaking right occupation and updated configuration information via a control channel of a Multimedia Broadcast Single Frequency Network (MBSFN) area.

Preferably, the first establishment module is configured to:

receive a trunking speaking right application request sent by the terminal applying for speaking right via the first base station, and send the trunking speaking right application request to the trunking scheduling management center, wherein the trunking speaking right application request contains a trunking session identity; and receive a trunking context establishment request sent by the trunking scheduling management center, and interact with the first base station and the terminal applying for speaking right to complete the establishment of the default bearer; wherein the trunking context establishment request is sent after the trunking scheduling management center performs authentication, certification and policy decision on the terminal applying for speaking right after receiving the trunking speaking right application request.

Preferably, the second establishment module is configured to:

receive a trunking dedicated speaking right application request message transparently transferred by the terminal applying for speaking right via the first base station;

interact with the SGW and the P-GW to perform a bearer establishment of a user with speaking right;

send a request for establishing bears for application for trunking dedicated speaking right to the first base station; and receive a message of completing establishment of bearers for application for trunking dedicated speaking right sent after the first base station completes configurations according to the request for establishing bears for application for trunking dedicated speaking right.

Preferably, the update module is configured to:

send a trunking speaking right update request to the SGW, and receive a trunking speaking right update response message returned by the SGW;

send a trunking speaking right update request to the trunking scheduling management center via the MBMS-GW, and receive a trunking speaking right update accept request returned by the trunking scheduling management center; and send a trunking speaking right request accept message to the terminal applying for speaking right via the first base station.

The example of the present document further provides a network subsystem, which comprises: an MME, a SGW and BM-SC and HSS connected to the MME, a MBMS-GW connected to the BM-SC, and a P-GW connected to both the BM-SC and the SGW, wherein:

the MME is the above MME;

the MBMS-GW is configured to: take charge of multicast address saving and data distribution and process a trunking service session control command;

the P-GW is configured to: receive a trunking service bearer establishment request sent by a trunking scheduling management center, and forward trunking service request information sent by a UE and processed by the MME to the trunking scheduling management center; and the HSS is configured to: save information of a base station to which a terminal belongs and an identity of a group to which the terminal belongs.

The example of the present document further provides a broadband wireless access subsystem, which comprises multi-cells or a Multicast Coordination Entity (MCE) and multiple base stations, wherein:

the base stations are configured to: establish radio bearers for trunking service sessions, and notify terminals which the base stations serve of the configured radio bearer information; and the MCE is configured to: take charge of performing allocation of radio resources of the trunking service sessions transmitted by a Multicast Broadcast Single Frequency Network (MBSFN) for the base stations in a MBSFN area.

Preferably, the MCE is configured to: receive a trunking service session start request from a Mobility Management Entity (MME), generate scheduling control information of the radio resources according to a quality of service, and send the scheduling control information to the base stations.

Preferably, the base stations are configured to: receive a request for establishing bears for application for trunking dedicated speaking right sent by the MME, perform an establishment of Radio Resource Control (RRC) connection reconfiguration with a terminal applying for speaking right which the base stations serve, and return a message of completing establishment of bearers for application for trunking dedicated speaking right to the MME.

The example of the present document further provides a Long Term Evolution (LTE)-based broadband trunking system, which comprises a terminal, a broadband wireless access subsystem, a network subsystem and a trunking scheduling management center which are connected sequentially, and an operation maintenance subsystem connected to both the broadband wireless access subsystem and the network subsystem, wherein:

the broadband wireless access subsystem is the above broadband wireless access subsystem;

the network subsystem is the above network subsystem;

the trunking scheduling management center is configured to: take charge of completing trunking service speaking right management and scheduling, authorization management of trunking single call or group call, assignment of type of service of trunking services and configuration of quality of service of trunking services; and the operation maintenance subsystem is configured to: complete various operations of account opening, account cancellation and user service authority of trunking users, and perform management on configuration of parameters, performance and security of devices of the broadband wireless access subsystem and the network subsystem.

Preferably, the system further comprises: an Internet Protocol Multimedia Subsystem (IMS), configured to: be located between the network subsystem and the trunking scheduling management center, and provide protocol and flow support for trunking functions.

The above LTE-based broadband trunking system is deployed in combination with the eMBMS technology and network elements, in the condition that new network element devices are not required to be added, point-to-multi-point characteristics of the trunking system can be satisfied by fully utilizing the eMBMS downlink multicast technology. Moreover, it is only required to modify or extend functions of part of the network elements, then the LTE-based broadband digital trunking system can be deployed, and it also can be integrated into a public network to some degree in the follow-up, meanwhile, the procedure of application for speaking right of LTE-based broadband trunking services can be implemented on this basis.

BRIEF DESCRIPTION OF DRAWINGS

FIG. 1 is a schematic diagram of structure of an LTE-based broadband digital trunking system according to the example of the present document;

FIG. 2 is a flow diagram 1 of a method for implementing the application for speaking right of the LTE-based broadband digital trunking system according to the example of the present document;

PREFERRED EMBODIMENTS OF THE PRESENT DOCUMENT

Figure 3:
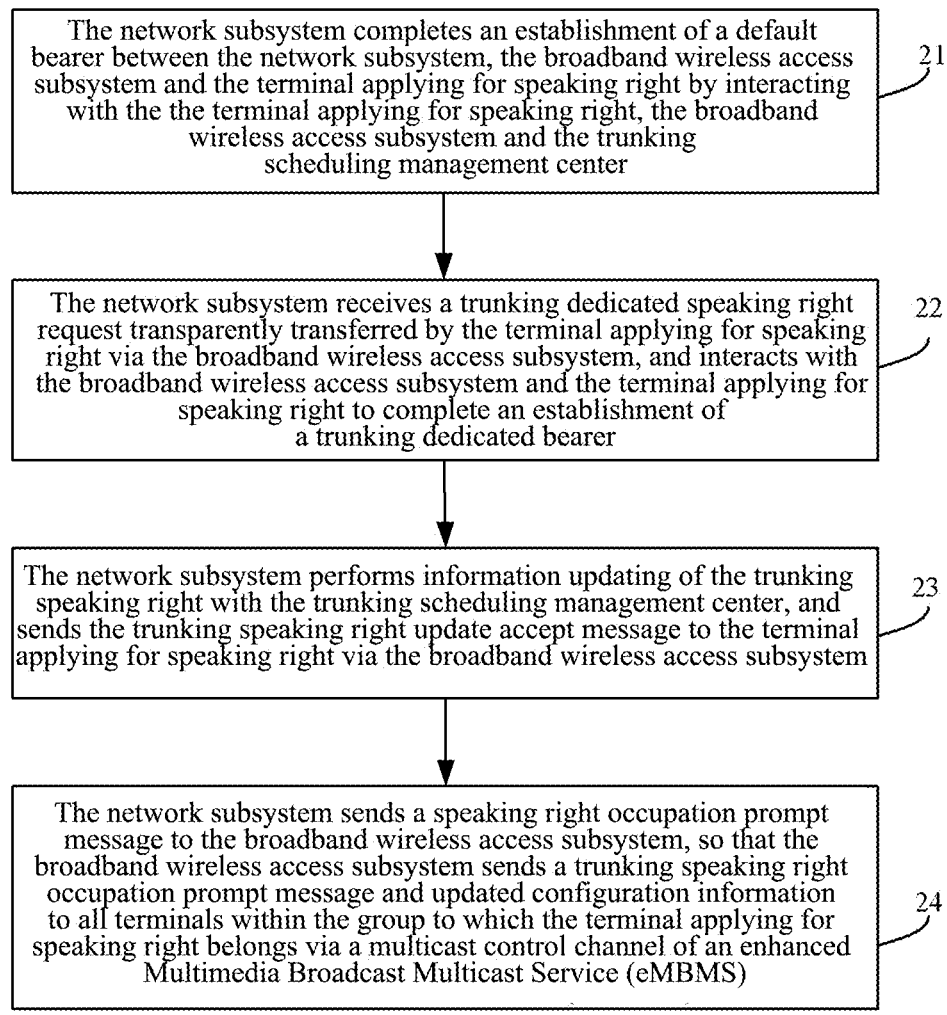
FIG. 3 is a flow diagram 2 of a method for implementing the application for speaking right of the LTE-based broadband digital trunking system according to the example of the present document.

The examples of the present document will be described in detail in combination with the accompanying drawings below. It should be noted that the examples in the present document and the characteristics in the examples can be optionally combined with each other in the condition of no conflict.

As shown in FIG. 1, it is a schematic diagram of structure of an LTE-based broadband digital trunking system according to the example of the present document, and the system includes a terminal 101, a broadband wireless access subsystem 102, a network subsystem 103, an IP Multimedia Subsystem (IMS) 104, a trunking scheduling management center 105 and an operation maintenance subsystem 106; and if the trunking scheduling management center can complete the same functions as that of the IMS, the IMS can be not deployed.

The above terminal includes a hand-held terminal, a vehicular station, a fixed station or a radio dispatching station.

The above broadband wireless access subsystem includes multiple Evolved Nodes B (eNodeB) and multi-cells or a Multicast Coordination Entity (MCE), an eNodeB establishes a radio bearer for a trunking service session, and notifies the terminal of the configured radio bearer information. The MCE is responsible for performing allocation of radio resources of the trunking service sessions transmitted by a Multicast Broadcast Single Frequency Network (MB-SFN) for the eNodeB in an MBSFN area, including the time domain resource allocation and the selection of coding modulation scheme; and the MCE is also responsible for transmitting a trunking service session control signaling sent by a Mobility Management Entity (MME).

Specifically, the MCE receives a trunking service session start request from an M3 interface, generates scheduling control information of the radio resources according to a Quality of Service (Qos), and sends the scheduling control information to the eNB through an M2 interface. The MCE and the eNodeB are connected via the M2 interface.

The hand-held mobile station, vehicular station, fixed station and radio dispatching station share the radio resources with the broadband wireless access subsystem via an LTE-Uu interface.

The above network subsystem includes a MME, a Service Gateway (SGW), a Home Subscriber Server (HSS), a Broadcast Multicast Service Center (BM-SC), a Multimedia Broadcast Multicast Service-Gateway (MBMS-GW) and a Packet Data Network Gateway (PDN-GW or P-GW).

The P-GW is respectively connected to gateways supporting different trunking service broadcast characteristics; and according to broadcast characteristics requested by the trunking request services, the P-GW respectively requests the SGW or the BM-SC for establishing wireless access bearers of the trunking services. The BM-SC, as a source of the trunking service data multicast, provides convergence and transmission of the trunking services, authorization of the trunking services, initiation of the bearer establishment and session control. The MBMS-GW takes charge of multicast address saving and data distribution and processes a trunking service session control command. The MME is a trunking service session control node, caches the established group call information, and takes charge of establishing, maintaining and releasing various trunking services. The MME receives a trunking service serving request from the SGW or MBMS-GW, configures a quality of service of the trunking services and transmission bearer information; and it controls to establish the trunking service wireless access bearer via an S1 interface or the M3 interface; meanwhile, the MME also forwards the received trunking service request of the user equipment to the PDN-GW. The HSS stores home subscription information of a terminal user, in order to support the trunking functions, it is required to newly add a module supporting the trunking services, and the module stores information of an eNodeB to which the UE belongs and an identity of a group to which the UE belongs (e.g., a Temporary Mobile Group Identity-ID (TMGI-ID)), that is, {group identity, group service distribution area information, terminal list information} is stored. The SGW is an end point of connecting a media data interface of the broadband wireless access subsystem, and it mainly takes charges of routing and forwarding of data packets.

Specifically, the MME is connected to the SGW via an S11 interface, the MME is connected to the HSS via an S6a interface, the MME is connected to the BM-SC via an Sm interface, the SGW is connected to the P-GW via an S5 interface, the BM-SC is connected to the P-GW via an SGi interface, and the BM-SC is connected to the MBMS-GW via SGmb and SGimb interfaces. The eNodeB is connected to the MBMS-GW via an M1 interface, and the MCE is connected to the MME via the M3 interface.

The above trunking scheduling management center is connected to the PDN-GW, and it takes charges of completing trunking service speaking right management and scheduling, authorization management of trunking single call/ group call, assignment of type of service of trunking services and configuration of quality of service of trunking services, furthermore, an authentication on the user terminal and the radio dispatching station, it is an entrance of the P-GW. Trunking application servers include an application server based on Push-to-Talk over Cellular (PoC), a trunking application server based on Global Open Trunking Architecture (GOTA) and other types of trunking application servers. If the other types of trunking application servers could complete a session control function by undergoing follow-up extensions, the IMS is not required to be deployed, a Session Initial Protocol (SIP) signaling is not used and a private signaling can be used.

The trunking scheduling management center informs the PDN-GW of a trunking service bearer establishment request; meanwhile, the PDN-GW forwards the trunking service request information sent by the UE and processed by the MME to the trunking scheduling management center.

In addition, the above operation maintenance subsystem mainly completes a user data management function, it can carry out operations such as account opening, account cancellation and change of user service authority and so on of the trunking users, and meanwhile it can perform management on the configuration of parameters, performance and security of devices of the broadband wireless access subsystem and the network subsystem.

Based on the broadband trunking system shown in FIG. 1, the example of the present document provides a method for implementing the application for speaking right, and descriptions are made from a perspective of the broadband wireless access subsystem in the method, and as shown in FIG. 2, the following steps are included.

In step 11, the broadband wireless access subsystem sends a trunking speaking right update request to the network subsystem, receives a trunking speaking right update accept message returned by the network subsystem, and sends the trunking speaking right update accept message to the terminal applying for speaking right.

The trunking speaking right update accept message is returned and received from the trunking scheduling management center after the network subsystem performs information updating of the trunking speaking right with the trunking scheduling management center according to the trunking speaking right update request.

Before the step 11, it can also include: the broadband wireless access subsystem completing an establishment of a default bearer by interacting with the terminal applying for speaking right, the network subsystem and the trunking scheduling management center; and the broadband wireless access subsystem transparently transferring a trunking dedicated speaking right request sent by the terminal applying for speaking right to the network subsystem, so that the network subsystem completes an establishment of a trunking dedicated bearer.

In step 12, the broadband wireless access subsystem receives the speaking right occupation prompt message sent by the network subsystem, and sends the trunking speaking right occupation prompt message and updated configuration information to all terminals within the group to which the terminal applying for speaking right belongs via a multicast control channel of an enhanced Multimedia Broadcast Multicast Service (eMBMS).

Similarly, based on the broadband trunking system shown in FIG. 1, the example of the present document provides a method for implementing the application for speaking right, descriptions are made from a perspective of the network subsystem in the method, and as shown in FIG. 3, the following steps are included.

In step 21, the network subsystem completes an establishment of a default bearer between the network subsystem, the broadband wireless access subsystem and the terminal applying for speaking right by interacting with the terminal applying for speaking right, the broadband wireless access subsystem and the trunking scheduling management center.

The step 21 can specifically include: the network subsystem receiving a trunking speaking right application request sent by the terminal applying for speaking right via the broadband wireless access subsystem, and sending the trunking speaking right application request to the trunking scheduling management center; and the network subsystem receiving a trunking context establishment request sent by the trunking scheduling management center, and interacting with the broadband wireless access subsystem and the terminal applying for speaking right to complete the establishment of the default bearer; wherein the trunking context establishment request is sent after the trunking scheduling management center performs authentication, certification and policy decision on the terminal applying for speaking right after receiving the trunking speaking right application request.

In step 22, the network subsystem receives a trunking dedicated speaking right request transparently transferred by the terminal applying for speaking right via the broadband wireless access subsystem, and interacts with the broadband wireless access subsystem and the terminal applying for speaking right to complete an establishment of a trunking dedicated bearer.

The above step 21 and step 22 are optional steps.

In step 23, the network subsystem performs information updating of the trunking speaking right with the trunking scheduling management center, and sends the trunking speaking right update accept message to the terminal applying for speaking right via the broadband wireless access subsystem.

The step 23 specifically includes: the network subsystem receiving the trunking speaking right update accept message sent by the trunking scheduling management center, and sending the trunking speaking right update accept message to the terminal applying for speaking right via the broadband wireless access subsystem.

In step 24, the network subsystem sends the speaking right occupation prompt message to the broadband wireless access subsystem, so that the broadband wireless access subsystem sends the trunking speaking right occupation prompt message and updated configuration information to all terminals within the group to which the terminal applying for speaking right belongs via a multicast control channel of an enhanced Multimedia Broadcast Multicast Service (eMBMS).

The technical scheme of the present document will be described in detail from a perspective of interaction between the terminal, the network subsystem, the broadband wireless access subsystem and the trunking scheduling management center below.

Figure 4:
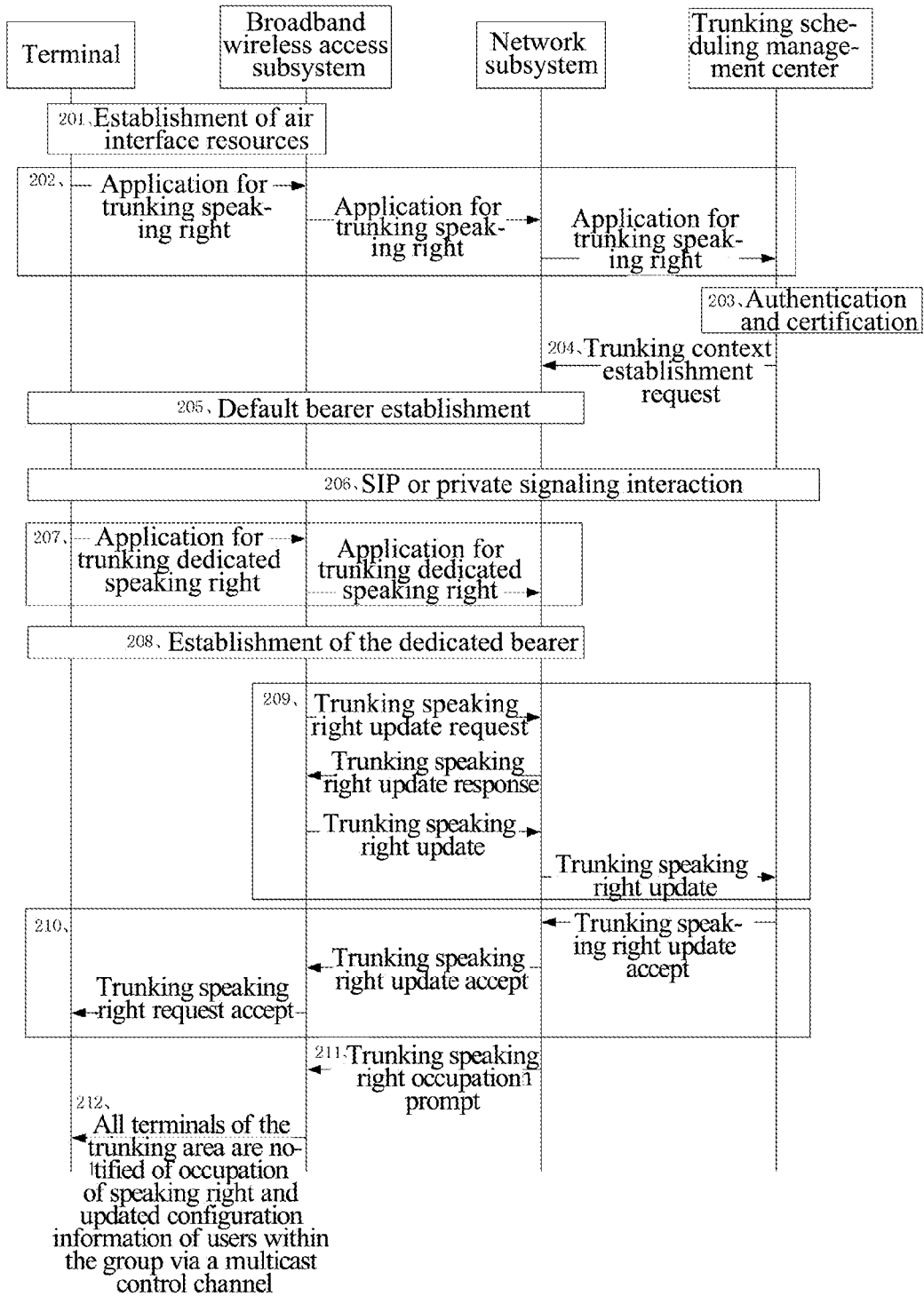
FIG. 4 is a flow diagram of overall signaling of the application process of speaking right of the LTE-based broadband digital trunking system according to the example of the present document.

As shown in FIG. 4, it is a flow diagram of overall signaling of the application process of speaking right of the LTE-based broadband digital trunking system according to the present document, and the procedure of the application for speaking right of the LTE-based broadband trunking system includes the following steps.

In step 201, a terminal user presses Push to Talk (PTT), and interacts with the broadband wireless access subsystem to complete an establishment of air interface resources.

In step 202, the terminal sends a trunking speaking right application request, and the request message is processed by the broadband wireless access subsystem and the network subsystem and forwarded to the trunking scheduling management center for performing the application for speaking right.

In step 203, the trunking scheduling management center performs authentication and certification on the terminal after receiving the the application for speaking right.

In step 204, according to a result of authentication and certification, if it is successful, the trunking scheduling management center sends a trunking context establishment request to the network subsystem, and if it fails, it sends a trunking context establishment rejection to the terminal via the network subsystem.

In step 205, the network subsystem interacts with the broadband wireless access subsystem and the terminal to complete an establishment of the default bearer after receiving the trunking context establishment request.

In step 206, the terminal and the trunking scheduling management center negotiate information such as configurations of the data required to be transferred in the follow-up through an SIP signaling or a private protocol signaling.

In step 207, the terminal transparently transfers a trunking dedicated speaking right application to the network subsystem via the broadband wireless access subsystem.

In step 208, the network subsystem interacts with the broadband wireless access subsystem and the terminal to complete an establishment of the trunking dedicated bearer after receiving the trunking dedicated speaking right request.

In step 209, the network subsystem and the trunking scheduling management center interact to perform the information updating of the trunking speaking right.

In step 210, the trunking scheduling management center sends the trunking speaking right update accept message to the network subsystem, and the network subsystem forwards the trunking speaking right update accept message to the wireless access subsystem, and the broadband wireless access subsystem sends the trunking speaking right request accept message to the terminal.

In step 211, after the network subsystem receives the trunking speaking right update accept message of the trunking scheduling management center, the network subsystem sends the speaking right occupation prompt message to the broadband wireless access subsystem.

In step 212, the broadband wireless access subsystem sends a trunking speaking right occupation prompt and update of configuration information to the terminals of the trunking group via a multicast control channel of an eMBMS.

For an easy understanding of the example of the present document, the specific implementation of the example of the present document will be further described by giving the specific application example as an example below.

Figure 5:
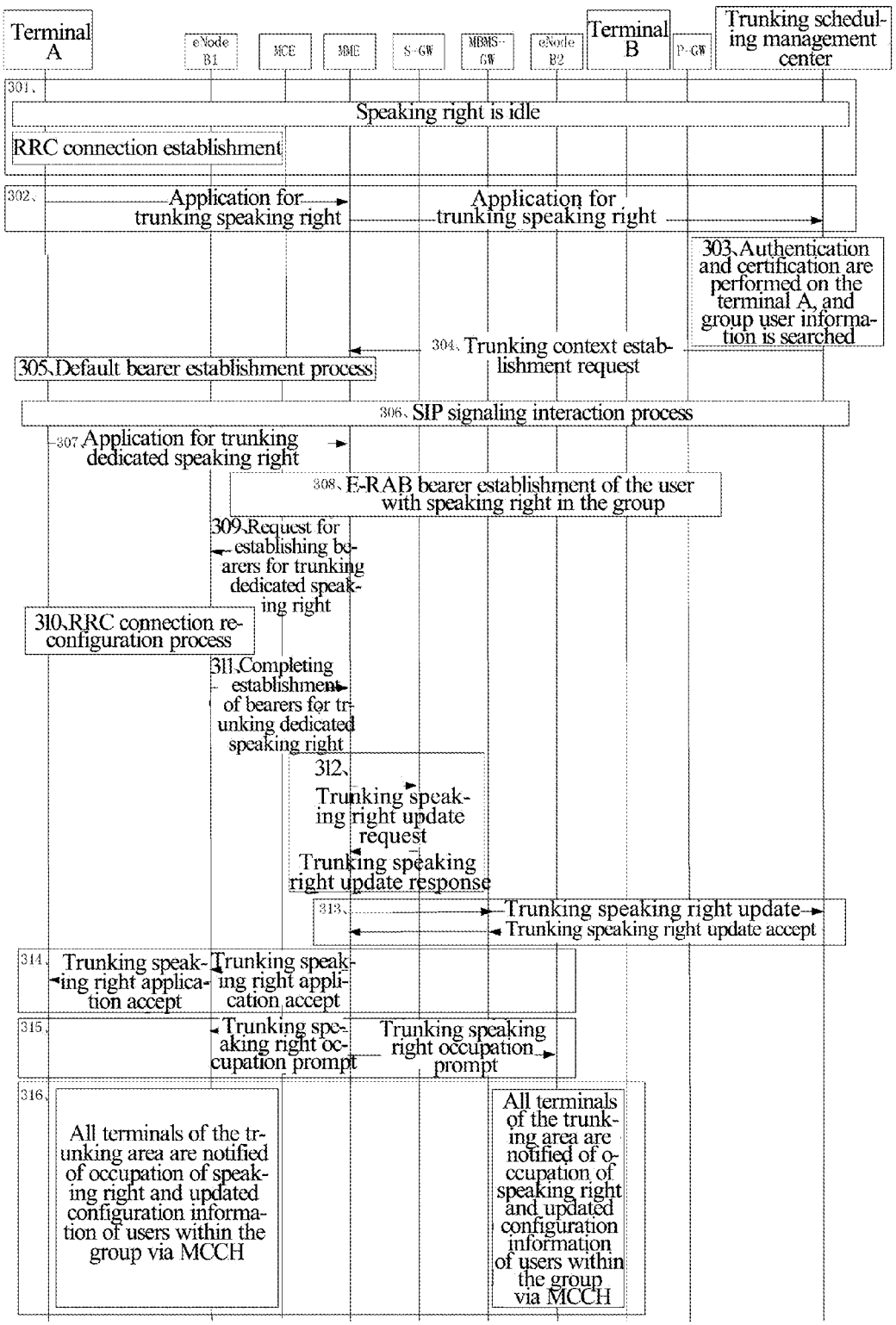
FIG. 5 is a flow diagram of signaling of the application for speaking right of the LTE-based broadband digital trunking system according to the example of the present document.

In combination with FIG. 5, a trunking terminal A is in an eNodeB1, a trunking terminal group B is in an eNodeB2, and the trunking terminal A and the terminal group B belong to the same MBSFN area and trunking group, and the the application process of speaking right of the LTE-based broadband trunking system includes the following steps.

In step 301, the terminal A is in an idle state, if the terminal A applies for the trunking speaking right, and when the user presses a PTT key, the terminal A and the eNodeB1 perform interaction for random access and RRC connection establishment.

In step 302, the terminal A sends a trunking speaking right application message to a trunking scheduling management center via a MME, the speaking right application message is encapsulated through Non-Access Stratum (NAS) message and it contains a trunking session identity.

In step 303, the trunking scheduling management center performs authentication and information confirmation within the trunking user group on the terminal A after receiving the trunking speaking right application of the terminal A.

In step 304, the trunking scheduling management center sends a trunking context establishment request to the MME after the authentication and certification performed on the terminal A is passed.

In step 305, the MME interacts with the eNodeB1 and the terminal A to complete an establishment of the default bearer.

In step 306, the terminal A and the trunking scheduling management center negotiate information such as a QoS, IP address and port number of the data required to be transferred in the follow-up through the SIP message.

In step 307, the terminal A transparently transfers the trunking dedicated speaking right application message to the MME via the eNodeB1, and the message is encapsulated through the NAS message.

In step 308, the MME interacts with an S-GW and a P-GW to perform the establishment of Evolved Radio Access Bearer (E-RAB) of the user.

In step 309, the MME sends a trunking dedicated speaking right bearer establishment request to the eNodeB1.

In step 310, the eNodeB1 performs an establishment of RRC connection reconfiguration after receiving the dedicated speaking right bearer establishment request, an uplink shared channel is mainly configured in the reconfiguration, and a multicast downlink channel is used in downlink.

In step 311, the eNodeB1 returns a message of completing establishment of bears for trunking dedicated speaking right to the MME after completing the configurations.

In step 312, the MME sends a trunking speaking right update request to the S-GW, and the S-GW returns the trunking speaking right update response message to the MME.

In step 313, the MME sends a trunking speaking right update request to the trunking scheduling management center via an MBMS-GW, and the trunking scheduling management center returns a trunking speaking right update accept request to the MME, to indicate the acceptance of the application for speaking right of the trunking terminal A.

In step 314, the MME sends the trunking speaking right application accept message to the terminal A via the eNodeB1, and the terminal A believes that the speaking right of this time is applied.

In step 315, the MME sends a trunking speaking right occupation prompt to the eNodeB1 and the eNodeB2 respectively.

In step 316, the eNodeB1 and the eNodeB2 notify the terminal group B and other terminals in the trunking group of the speaking right having been occupied via a MCCH channel of the MBSFN area, and they update the configuration information.

The above trunking system architecture is deployed in combination with the eMBMS technology and network elements, in the condition that new network element devices are not required to be added, point-to-multipoint characteristics of the trunking system can be satisfied by fully utilizing the eMBMS downlink multicast technology. Moreover, it is only required to modify or extend functions of part of the network elements, then the LTE-based broadband digital trunking system can be deployed, and it also can be integrated into a public network to some degree in the follow-up, meanwhile, the procedure of application for speaking right can be implemented on this basis.

Figure 6:
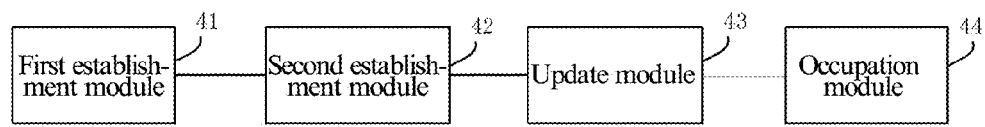
FIG. 6 is a schematic diagram of structure of an MME according to the example of the present document.

Corresponding to the above method, the example of the present document also provides a Mobility Management Entity (MME) which is applied in the LTE-based broadband trunking system, and as shown in FIG. 6, the MME includes:

a first establishment module 41, used to: by interacting with a terminal applying for speaking right, a first base station to which the terminal applying for speaking right belongs and a trunking scheduling management center, complete an establishment of a default bearer between the first establishment module, the first base station and the terminal applying for speaking right;

a second establishment module 42, used to: by interacting with the first base station, and a Service Gateway (SGW) and a Packet Data Network Gateway (P-GW) located in the same network subsystem in which the MME is located, complete an establishment of a trunking dedicated speaking right application bearer;

an update module 43, used to: by interacting with a Multimedia Broadcast Multicast Service-Gateway (MBMS-GW), the SGW and the trunking scheduling management center, complete the update of trunking speaking right, and send a trunking speaking right request accept message to the terminal applying for speaking right via the first base station; and an occupation module 44, used to: respectively send a trunking speaking right occupation prompt to the first base station and the second base station to which other idle terminals belongs in the same group in which the terminal applying for speaking right is located, so that the first base station and the second base station notify all terminals within the corresponding trunking area of the occupation of speaking right and updated configuration information via a control channel of a Multicast Broadcast Single Frequency Network (MBSFN) area.

The first establishment module is specifically used to:

receive a trunking speaking right application request sent by the terminal applying for speaking right via the first base station, and send the trunking speaking right application request to the trunking scheduling management center, wherein the trunking speaking right application request contains a trunking session identity; and receive a trunking context establishment request sent by the trunking scheduling management center, and interact with the first base station and the terminal applying for speaking right to complete the establishment of the default bearer; wherein the trunking context establishment request is sent after the trunking scheduling management center performs authentication, certification and policy decision on the terminal applying for speaking right after receiving the trunking speaking right application request.

The second establishment module is specifically used to: receive the trunking dedicated speaking right application request message transparently transferred by the terminal applying for speaking right via the first base station; interact with the SGW and the P-GW to perform a bearer establishment of a user with speaking right; send a request for establishing bears for application for trunking dedicated speaking right to the first base station; and receive a message of completing establishment of bearers for application for trunking dedicated speaking right sent after the first base station completes the configurations according to the request for establishing bears for application for trunking dedicated speaking right.

The update module is specifically used to: send a trunking speaking right update request to the SGW, and receive a trunking speaking right update response message returned by the SGW; send a trunking speaking right update request to the trunking scheduling management center via the MBMS-GW, and receive a trunking speaking right update accept request returned by the trunking scheduling management center; and send the trunking speaking right request accept message to the terminal applying for speaking right via the first base station.

A working flow of the MME may refer to FIG. 5.

The example of the present document also provides a network subsystem, which includes: the MME shown in FIG. 6, a SGW and BM-SC and HSS connected to the MME, a MBMS-GW connected to the BM-SC, and a P-GW connected to both the BM-SC and the SGW, wherein:

the MBMS-GW is used to: take charge of multicast address saving and data distribution and process a trunking service session control command;

the P-GW is used to: receive a trunking service bearer establishment request sent by a trunking scheduling management center, and forward the trunking service request information sent by the UE and processed by the MME to the trunking scheduling management center; and the HSS is used to: save information of a base station to which the terminal belongs and an identity of a group to which the terminal belongs.

In addition, the example of the present document also provides a broadband wireless access subsystem, which includes multi-cells or a Multicast Coordination Entity (MCE) and multiple base stations, wherein:

the base stations are used to: establish radio bearers for trunking service sessions, and notify terminals which the base stations serve of the configured radio bearer information; and the MCE is used to: take charge of performing allocation of radio resources of the trunking service sessions transmitted by a Multicast Broadcast Single Frequency Network (MBSFN) for the base stations in a MBSFN area.

The MCE is specifically used to: receive a trunking service session start request from a Mobility Management Entity (MME), generate scheduling control information of the radio resources according to a quality of service, and send the scheduling control information to the base stations.

In addition, the base stations are specifically used to: receive a request for establishing bears for application for trunking dedicated speaking right sent by the MME, perform an establishment of RRC connection reconfiguration with a terminal applying for speaking right which the base stations serve, and return the message of completing establishment of bearers for application for trunking dedicated speaking right to the MME.

A connection relationship between the above network subsystem and the broadband wireless access subsystem may refer to FIG. 1, and with a mutual coordination of the two systems and the trunking scheduling management center, the broadband digital trunking system can be implemented, and the function of applying for speaking right also can be implemented.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present document is not limited to any combination of hardware and software in a specific form.

The above examples are only used to describe the technical scheme of the present document, which does not limit the technical scheme of the present document. The present document is just described in detail with reference to the preferred examples. The ordinary person skilled in the art should understand that, with respect to the technical scheme of the present document, modifications or equivalent substitutions can be made without departing from the spirit and scope of the technical scheme of the present document, and all these modifications and equivalent substitutions should be covered within the scope of the claims of the present document.

INDUSTRIAL APPLICABILITY

The above LTE-based broadband trunking system is deployed in combination with the eMBMS technology and network elements, in the condition that new network element devices are not required to be added, point-to-multipoint characteristics of the trunking system can be satisfied by fully utilizing the eMBMS downlink multicast technology. Moreover, it is only required to modify or extend functions of part of the network elements, then the LTE-based broadband digital trunking system can be deployed, and it also can be integrated into a public network to some degree in the follow-up, meanwhile, the procedure of application for speaking right of LTE-based broadband trunking services can be implemented on this basis.

What is claimed is:

1. A network subsystem, comprising: a MME, a SGW and BM-SC and HSS connected to the MME, a MBMS-GW connected to the BM-SC, and a P-GW connected to both the BM-SC and the SGW, wherein:
the MME comprises a first establishment module, a second establishment module, an
update module and an occupation module:
said first establishment module is configured to: by interacting with a terminal applying for speaking right, a first base station to which the terminal applying for speaking right belongs and a trunking scheduling management center, complete an establishment of a default bearer between the first establishment module, the first base station and the terminal applying for speaking right;

said second establishment module is configured to: by interacting with the first base station, and a Service Gateway (SGW) and a Packet Data Network Gateway (P-GW) located in the same network subsystem in which the MME is located, complete an establishment of a trunking dedicated speaking right application bearer:

said update module is configured to: by interacting with a Multimedia Broadcast Multicast Service-Gateway (MBMS-GW), the SGW and the trunking scheduling management center, complete a trunking speaking right update, and send a trunking speaking right request accept message to the terminal applying for speaking right via the first base station; and said occupation module is configured to: send a trunking speaking right occupation prompt respectively to the first base station and a second base station to which other idle terminals belongs in the same group in which the terminal applying for speaking right is located, so that the first base station and the second base station notify all terminals within a corresponding trunking area of occupation of speaking right and updated configuration information via a control channel of a Multimedia Broadcast Single Frequency Network (MB-SFN) area;

the MBMS-GW is configured to: take charge of multicast address saving and data distribution and process a trunking service session control command;

the P-GW is configured to: receive a trunking service bearer establishment request sent by a trunking scheduling management center, and forward trunking service request information sent by a UE and processed by the MME to the trunking scheduling management center; and the HSS is configured to: save information of a base station to which a terminal belongs and an identity of a group to which the terminal belongs.

2. A method for implementing application for speaking right of a Long Term Evolution (LTE)-based broadband trunking system, wherein the LTE-based broadband trunking system comprises a terminal applying for speaking right, a broadband wireless access subsystem, a network subsystem according to claim 1 and a trunking scheduling management center, and the method comprises:

the broadband wireless access subsystem sending a trunking speaking right update request to the network subsystem, receiving a trunking speaking right update accept message returned by the network subsystem, and sending the trunking speaking right update accept message to the terminal applying for speaking right; and the broadband wireless access subsystem receiving a speaking right occupation prompt message sent by the network subsystem, and sending a trunking speaking right occupation prompt message and updated configuration information to all terminals within a group to which the terminal applying for speaking right belongs via a multicast control channel of an enhanced Multimedia Broadcast Multicast Service (eMBMS).

3. The method according to claim 2, wherein before the broadband wireless access subsystem sends the trunking speaking right update request to the network subsystem, the method further comprises:

the broadband wireless access subsystem completing an establishment of a default bearer by interacting with the terminal applying for speaking right, the network subsystem and the trunking scheduling management center; and the broadband wireless access subsystem transparently transferring a trunking dedicated speaking right request sent by the terminal applying for speaking right to the network subsystem, so that the network subsystem completes an establishment of a trunking dedicated bearer.

4. The method according to claim 3, wherein the broadband wireless access subsystem completing the establishment of the default bearer by interacting with the terminal applying for speaking right, the network subsystem and the trunking scheduling management center comprises:

the broadband wireless access subsystem receiving a trunking speaking right application request sent by the terminal applying for speaking right, and sending the trunking speaking right application request to the trunking scheduling management center via the network subsystem; and the network subsystem receiving a trunking context establishment request sent by the trunking scheduling management center, and interacting with the broadband wireless access subsystem and the terminal to complete the establishment of the default bearer; wherein the trunking context establishment request is sent after the trunking scheduling management center performs authentication, certification and policy decision on the terminal after receiving the trunking speaking right application request.

5. The method according to claim 4, wherein the broadband wireless access subsystem sending the trunking speaking right update request to the network subsystem, and receiving the trunking speaking right update accept message returned by the network subsystem comprises:

the broadband wireless access subsystem sending the trunking speaking right update request to the network subsystem, the network subsystem receiving the trunking speaking right update accept message returned by the trunking scheduling management center after performing information updating of a trunking speaking right with the trunking scheduling management center according to the trunking speaking right update request, and the broadband wireless access subsystem receiving the trunking speaking right update accept message returned by the network subsystem.

6. The method according to claim 3, wherein the broadband wireless access subsystem sending the trunking speaking right update request to the network subsystem, and receiving the trunking speaking right update accept message returned by the network subsystem comprises:

the broadband wireless access subsystem sending the trunking speaking right update request to the network subsystem, the network subsystem receiving the trunking speaking right update accept message returned by the trunking scheduling management center after performing information updating of a trunking speaking right with the trunking scheduling management center according to the trunking speaking right update request, and the broadband wireless access subsystem receiving the trunking speaking right update accept message returned by the network subsystem.

7. The method according to claim 2, wherein
the broadband wireless access subsystem sending the trunking speaking right update request to the network subsystem, and receiving the trunking speaking right update accept message returned by the network subsystem comprises:
the broadband wireless access subsystem sending the trunking speaking right update request to the network subsystem, the network subsystem receiving the trunking speaking right update accept message returned by the trunking scheduling management center after performing information updating of a trunking speaking right with the trunking scheduling management center according to the trunking speaking right update request, and the broadband wireless access subsystem receiving the trunking speaking right update accept message returned by the network subsystem.

8. The network subsystem according to claim 1 wherein the first establishment module is configured to:
receive a trunking speaking right application request sent by the terminal applying for speaking right via the first base station, and send the trunking speaking right application request to the trunking scheduling management center, wherein the trunking speaking right application request contains a trunking session identity; and
receive a trunking context establishment request sent by the trunking scheduling management center, and interact with the first base station and the terminal applying for speaking right to complete the establishment of the default bearer; wherein the trunking context establishment request is sent after the trunking scheduling management center performs authentication, certification and policy decision on the terminal applying for speaking right after receiving the trunking speaking right application request.

9. The network subsystem according to claim 1 wherein the second establishment module is configured to:
receive a trunking dedicated speaking right application request message transparently transferred by the terminal applying for speaking right via the first base station;
interact with the SGW and the P-GW to perform a bearer establishment of a user with speaking right;
send a request for establishing bears for application for trunking dedicated speaking right to the first base station; and
receive a message of completing establishment of bearers for application for trunking dedicated speaking right sent after the first base station completes configurations according to the request for establishing bears for application for trunking dedicated speaking right.

10. The network subsystem according to claim 1 wherein the update module is configured to:
send a trunking speaking right update request to the SGW, and receive a trunking speaking right update response message returned by the SGW;
send a trunking speaking right update request to the trunking scheduling management center via the MBMS-GW, and receive a trunking speaking right update accept request returned by the trunking scheduling management center; and
send the trunking speaking right request accept message to the terminal applying for speaking right via the first base station.

11. A method for implementing application for speaking right of a Long Term Evolution (LTE)-based broadband trunking system, wherein the LTE-based broadband trunking system comprises a terminal applying for speaking right, a broadband wireless access subsystem, a network subsystem according to claim 1 and a trunking scheduling management center, and the method comprises:
the network subsystem performing information updating of a trunking speaking right with the trunking scheduling management center, and sending a trunking speaking right update accept message to the terminal applying for speaking right via the broadband wireless access subsystem; and
the network subsystem sending a speaking right occupation prompt message to the broadband wireless access subsystem, so that the broadband wireless access subsystem sends a trunking speaking right occupation prompt message and updated configuration information to all terminals within a group to which the terminal applying for speaking right belongs via a multicast control channel of an enhanced Multimedia Broadcast Multicast Service (eMBMS).

12. The method according to claim 11, wherein
before the network subsystem performs information updating of the trunking speaking right with the trunking scheduling management center, the method further comprises:
the network subsystem completing an establishment of a default bearer between the network subsystem, the broadband wireless access subsystem and the terminal applying for speaking right by interacting with the terminal applying for speaking right, the broadband wireless access subsystem and the trunking scheduling management center; and
the network subsystem receiving a trunking dedicated speaking right request transparently transferred by the terminal applying for speaking right via the broadband wireless access subsystem, and interacting with the broadband wireless access subsystem and the terminal applying for speaking right to complete an establishment of a trunking dedicated bearer.

13. The method according to claim 12, wherein
the network subsystem completing the establishment of the default bearer between the network subsystem, the broadband wireless access subsystem and the terminal applying for speaking right by interacting with the terminal applying for speaking right, the broadband wireless access subsystem and the trunking scheduling management center comprises:
the network subsystem receiving a trunking speaking right application request sent by the terminal applying for speaking right via the broadband wireless access subsystem, and sending the trunking speaking right application request to the trunking scheduling management center; and
the network subsystem receiving a trunking context establishment request sent by the trunking scheduling management center, and interacting with the broadband wireless access subsystem and the terminal applying for speaking right to complete the establishment of the default bearer; wherein the trunking context establishment request is sent after the trunking scheduling management center performs authentication, certification and policy decision on the terminal applying for speaking right after receiving the trunking speaking right application request.

14. The method according to claim 11, wherein
the network subsystem sending the trunking speaking right update accept message to the
terminal applying for speaking right via the broadband wireless access subsystem comprises:

the network subsystem receiving the trunking speaking right update accept message sent by the trunking scheduling management center, and sending the trunking speaking right update accept message to the terminal applying for speaking right via the broadband wireless access subsystem.

15. A Long Term Evolution (LTE)-based broadband trunking
system, comprising a terminal, a broadband wireless access subsystem, a network subsystem and a trunking scheduling management center which are connected sequentially, and an operation maintenance subsystem connected to both the broadband wireless access subsystem and the network subsystem, wherein:
the broadband wireless access subsystem comprises multi-cells or a Multicast Coordination Entity (MCE) and multiple base stations, wherein the base station is configured to: establish radio bearers for trunking service sessions, and notify terminals which the base station serves of configured radio bearer information; and the MCE is configured to: take charge of performing allocation of radio resources of trunking service sessions transmitted by a Multicast Broadcast Single Frequency Network (MB SEN) for the base stations in a MBSFN area;
the network subsystem is the network subsystem according to claim 1;
the trunking scheduling management center is configured to: take charge of completing trunking service speaking right management and scheduling, authorization management of trunking single call or group call, assignment of type of service of trunking services and configuration of quality of service of trunking services; and
the operation maintenance subsystem is configured to: complete various operations of account opening, account cancellation and user service authority of trunking users, and perform management on configuration of parameters, performance and security of devices of the broadband wireless access subsystem and the network subsystem.

16. The system according to claim 15, wherein
the MCE is configured to: receive a trunking service session start request from a Mobility Management Entity (MME), generate scheduling control information of radio resources according to a quality of service, and send the scheduling control information to the base stations.

17. The broadband wireless access system according to claim 15, wherein
the base station is configured to: receive a request for establishing bears for application for trunking dedicated speaking right sent by the MME, perform an establishment of Radio Resource Control (RRC) connection reconfiguration with a terminal applying for speaking right which the base station serves, and return a message of completing establishment of bearers for application for trunking dedicated speaking right to the MME.

18. The system according to claim 15, further comprising:
an Internet Protocol Multimedia Subsystem (IMS), configured to: be located between the network subsystem and the trunking scheduling management center, and provide protocol and flow support for trunking functions.

* * * * *